UNITED STATES PATENT OFFICE 2,457,768

STYRENE-OIL SOLUBLE NATURAL RESIN-DRYING OIL INTERPOLYMER

James A. Arvin, Homewood, and Wayne B. Gitchel, Chicago, Ill., assignors to The Sherwin-Williams Company, Cleveland, Ohio, a corporation of Ohio No Drawing. Application April 19, 1945, Serial No. 589,266

18 Claims. (Cl. 260—23)

This invention relates to new and improved film forming compositions and more particularly to new and improved varnishes and enamels, and to a method of producing them.

An object of the invention is to produce new and improved film forming compositions from readily available raw materials.

A further object of the invention is to provide new and useful film forming materials which produce excellent clear, hard films of high gloss, toughness, hardness, adherence, good brushing characteristics, satisfactory drying characteristics and good recoatability.

An additional object of the invention is to provide new and improved types of enamels. Other objects will appear hereinafter.

In accordance with this invention it has been found that new and useful interpolymers are obtained by polymerizing a styryl compound (e. g., styrene), a resin acid of the type containing free carboxylic acid groups (e. g., rosin), and a relatively small amount, preferably about 5% to about 35% by weight of a drying oil based on the total weight of the interpolymer, the proportions of the reactants preferably being such as to produce an interpolymer which when at least partially esterified with a polyhydric alcoholyzed drying oil, is soluble in non-aromatic hydrocarbon solvents, as hereinafter more fully described. The resultant polymerization products produce excellent varnishes and enamels when they are at least partially esterified by a polyhydric alcoholyzed drying oil and thinned with solvents.

The polymerization is effected by heating, preferably at temperatures below the decomposition temperatures of the reacting components and above about 300 degrees F. Good results have been obtained without the use of catalysts but catalysts may be used if desired.

In the practice of the invention, using rosin, styrene, and a drying oil in the initial polymerization, it is preferable to heat the reacting ingredients to refluxing temperatures and to increase the temperature to maintain refluxing conditions during the polymerization. Styrene refluxes at about 325 degrees F. in the presence of rosin and a small percentage of drying oil under atmospheric pressure conditions. Rosin begins to decompose at temperatures above 550 degrees F. and hence it is desirable to maintain temperatures below this point while free rosin is present.

As previously indicated, the interpolymers or polymerization products, as they are referred to herein, produce excellent varnishes when at least partially esterified and dissolved in a polyhydric alcoholyzed drying oil. The expression "polyhydric alcoholyzed drying oil" is used herein to describe an oil produced by heating a drying oil or a semi-drying oil with a polyhydric alcohol, such as glycerine, pentaerythritol, polypentaerythritol, sorbitol and mono- and polyethylene glycols, until the glyceride structure of the drying oil or semi-drying oil is partially hydroxylated. In other words, one or more of the long chain or fatty acid groups of the oil glyceride has been displaced from the glyceride molecule by reaction with the added polyhydric alcohol thereby leaving one or more free hydroxy groups in the oil glyceride nucleus free to react with the previously prepared interpolymer.

The reaction with the polyhydric alcoholyzed drying oil is conducted at elevated temperatures, preferably around 400 to 600 degrees F. depending upon the type of oil and the pressure conditions. Atmospheric pressures are ordinarily employed and no blowing is necessary. This reaction may be effected, however, under atmospheric, sub-atmospheric or superatmospheric pressures with or without blowing. The heating is continued until the desired reaction has been effected and the desired body has been obtained which will usually require around 3 to 6 hours at temperatures of say 550 degrees F. Since polymerization and esterification reactions are occurring simultaneously, the use of higher temperatures may affect somewhat the properties of the products, the higher temperatures tending to speed polymerization more than esterification.

The invention will be illustrated, but is not limited by the following examples in which the quantities are stated in parts by weight, unless otherwise indicated:

Example I

A solution of 16 parts of benzoyl peroxide in 154 parts of styrene was added dropwise, during the course of 9 hours, to a heated mixture (300 degrees F). of 1989 parts of rosin, 509 parts of styrene and 848 parts of dehydrated castor oil.

The temperature was raised to 310 degrees F. for one and one-half hours, and to 396 degrees F. for two and one-half hours. The product was a clear, tacky, rubbery solid with an acid value of 91.

A polyhydric alcoholyzed oil was prepared by heating 1439 parts of dehydrated castor oil and 76 parts of glycerine to 400 degrees F., then adding 3.0 parts of litharge, and heating to 445 degrees F. for one hour. To this was added 1520 parts of the rosin-styrene-dehydrated castor oil resin. The temperature was then held at 460 degrees F. for three and one-half hours, at 490 degrees F. for five and one-half hours, and at 495 degrees F. for five hours. The product had an acid value of 12.5, a "cure" greater than three minutes, and a viscosity of H (Gardner-Holdt) at 60% solids in mineral spirits. The material was infinitely soluble in mineral spirits. A film of the material, with 0.5% lead and 0.5% cobalt as naphthenate driers, dried in a satisfactory time to an excellent, clear film. Enamels formulated with the material were excellent in all respects except that a rather long dry was required before recoating could be attempted without "lifting" of the undercoat. (Passed recoatability test after a 24-hour dry; failed recoatability test after an 18-hour dry.)

*Example II*

A solution of 16 parts of benzoyl peroxide in 184 parts of styrene was added dropwise, during the course of 9 hours, to a heated mixture (300 degrees F.) of 1600 parts of rosin, 616 parts of styrene and 1110 parts of dehydrated castor oil. After the solution was all added, the temperature was raised to 310 degrees F. for two hours, to 395 degrees F. over a period of one hour, and held at 395 degrees F. for two and one-half hours. The resin product was a clear, tacky, rubbery material with an acid value of 75.5

A mixture of 1360 parts of dehydrated castor oil and 70 parts of glycerine was heated to 400 degrees F., 2.8 parts of litharge was added, and the temperature was raised to 445 degrees F. for one hour. This alcoholyzed oil was used in making a varnish by adding 1705 parts of the rosin-styrene-dehydrated castor oil resin. The temperature was held at 460 degrees F. for five hours, 480 degrees F. for one hour, and 490 degrees F. for seven hours. At this point, the acid value was 5.9, the "cure" was 95 seconds, and the viscosity K-L (Gardner-Holdt) at 60% solids in mineral spirits. The product was infinitely soluble in mineral spirits. A film of the material, with 0.5% lead and 0.05% cobalt as naphthenate driers, dried in a satisfactory time to an excellent, clear film. Enamels formulated with this material were excellent except that they required a rather long dry before recoating could be attempted without "lifting" of the undercoat. (Passed recoatability test after a 24-hour dry, but failed it after an 18-hour dry.)

*Example III*

A mixture of 2 parts of rosin, 1 part of styrene and 1 part of dehydrated castor oil was heated so that a steady reflux of monomeric styrene was maintained. In five hours, the temperature was raised from 325 degrees F. to 450 degrees F., at which temperature there was no refluxing. A sample of the material gave a melting point of 125 degrees F. The temperature of the reaction mixture was held at 450 degrees F. for two and one-half hours with no increase in melting point. The product was steam distilled at 440 degrees F. for about an hour, during which time about 2% of the material was removed. The resin product was a clear, tacky, rubbery material with an acid value of 76.6.

A varnish was made from this resin as follows: 1267 parts of dehydrated castor oil and 67 parts of glycerine were heated with good agitation to 350 degrees F.; 3.2 parts of litharge was added; the temperature was raised to 440 degrees F. for 45 minutes, then 1333 parts of the rosin-styrene-dehydrated castor oil resin was added and the temperature held at 550 degrees F. for four hours. The product had a "cure" of 25 seconds, an acid value of 5.9, and a viscosity of U (Gardner-Holdt) at 60% solids in mineral spirits. The varnish solution of 60% solids in mineral spirits was clear, and with 0.5% lead and 0.05% cobalt as naphthenate driers, dried in satisfactory time to an excellent film. The film was clear. Enamels formulated with the material gave films of excellent gloss and passed recoatability tests after 16 to 18 hours dry.

*Example IV*

The same procedure was followed as in Example III, using 2 parts of rosin, 1 part of styrene and 0.45 part of dehydrated castor oil. Heating at 325 to 450 degrees F. for five hours and at 450 degrees F. for two and one-half hours, followed by steam distillation at 440 degrees F. for about an hour, gave a clear, amber, brittle product having an acid value of 89.4 and a melting point of 128.

A varnish was prepared by the procedure followed in Example III using 1350 parts of dehydrated castor oil, 68 parts of glycerine, 3.2 parts of litharge and 1150 parts of the rosin-styrene-dehydrated castor oil resin. After the resin was added, the temperature was held at 550 degrees F. for four hours. The product had a "cure" of 30 to 31 seconds, an acid value of 4.73 and a viscosity of U (Gardner-Holdt) at 60% solids in mineral spirits. The varnish solution of 60% solids in mineral spirits was clear, and with 0.5% lead and 0.05% cobalt as naphthenate driers, dried in satisfactory time to an excellent, clear film. Enamels formulated with the material gave films of excellent gloss and passed recoatability tests after 16 to 18 hours dry.

*Example V*

The same procedure was followed as in Example III, using 2 parts of rosin, 1 part of styrene and 0.36 part of dehydrated castor oil. Heating at 325 to 450 degrees F. for five hours and at 450 degrees F. for two and one-half hours, followed by a steam blow at 440 degrees F. for about an hour, gave a clear, amber, brittle product having an acid value of 93.5 and a melting point of 130 degrees F.

A varnish was made from this resin by the procedure followed in Example III using 1480 parts of dehydrated castor oil, 70 parts of glycerine, 3.2 parts of litharge and 1120 parts of the rosin-styrene-dehydrated castor oil resin. The temperature was held at 550 degrees F. for four hours. The product had a "cure" of 32 seconds, an acid value of 9.27, and a viscosity of T (Gardner-Holdt) at 60% solids in mineral spirits was clear, and with 0.5% lead and 0.5% cobalt as naphthenate driers, dried in satisfactory time to an excellent film. The film was very faintly cloudy. Enamels formulated with the material gave films of excellent gloss and passed recoatability tests after 16 to 18 hours dry.

Example VI

A mixture of 1.5 parts of rosin, 1 part of styrene and 0.3 part of dehydrated castor oil was heated as in Example III. At the end of eleven hours the temperature was up to 480 degrees F., the melting point remaining constant at 140 degrees F. for the last hour. The mixture was steam distilled for 45 minutes and blown with carbon dioxide for another 15 minutes. The final product had an acid number of 74.3 and a melting point of 170 degrees F.

A varnish was prepared by the procedure followed in Example III using 1370 parts of dehydrated castor oil, 61 parts of glycerine, 3.2 parts of litharge and 1230 parts of the rosin-styrene-dehydrated castor oil resin. After the resin was added, a temperature of 550 degrees F. was held for four hours. The product had a "cure" of 29 seconds, an acid value of 6.35, and a viscosity of V (Gardner-Holdt) for 60% solids in mineral spirits. The varnish solution in mineral spirits at 60% solids was cloudy, and with 0.5% lead and 0.05% cobalt as naphthenate driers, dried in satisfactory time to an excellent film except that it remained cloudy. Enamels formulated with the material gave films of excellent gloss and passed recoatability tests after 16 to 18 hours dry.

Example VII

A mixture of 2 parts of rosin, 1 part of styrene and 0.15 part of dehydrated castor oil was heated at reflux temperature. Over a period of five and one-fourth hours of heating the temperature was increased from 325 degrees F. to 420 degrees F. A sample of the material cooled to give a brittle solid having a melting point of 135 degrees F. Another one and one-half hours of heating at 450 degrees F. raised the melting point to 142 degrees F., but the melting point remained constant for an additional one-half hour heating at 450 degrees F. About 1.5% of the material was removed by a one hour superheated steam blow at 440 degrees F. The product was a clear, amber brittle resin with a melting point of 145 degrees F. and an acid value of 101.8.

A varnish was made from this product by the procedure followed in Example III, using 1550 parts of dehydrated castor oil, 71 parts of glycerine, 3.2 parts of litharge and 1050 parts of the rosin-styrene-dehydrated castor oil resin. In four and one-half hours at 550 degrees F., the "cure" reached 23 seconds, the acid value 7.46 and the viscosity W (Gardner-Holdt) at 60% solids in mineral spirits. The varnish solution at 60% solids in mineral spirits was definitely cloudy. A film of the material, with 0.5% lead and 0.05% cobalt as naphthenate driers, dried in satisfactory time to an excellent film except that the film was slightly coudy. Enamels formulated with the material gave films of excellent gloss and passed recoatability tests after 16 to 18 hours dry.

Example VIII

A mixture of 1½ parts of rosin, 1 part of styrene and 0.13 part of dehydrated castor oil was heated as in Example III. Heating at 318 to 476 degrees F. for nine hours, followed by a one-hour steam blow gave a clear, amber, brittle resin having an acid number of 93 and a melting point of 160 degrees F.

A varnish was prepared by the procedure followed in Example III, using 1550 parts of dehydrated castor oil, 65 parts of glycerine, 3.2 parts of litharge and 1050 parts of the rosin-styrene-dehydrated castor oil resin. After the resin had been added, the temperature was held at 550 degrees F. for four and one-half hours. The product had a "cure" of 30 seconds, an acid value of 8.3 and a viscosity of X (Gardner-Holdt) for 60% solids in mineral spirits. The varnish solution in mineral spirits at 60% solids was cloudy and with 0.5% lead and 0.05% cobalt as naphthenate driers, dried in satisfactory time to an excellent film except that it remained cloudy. Enamels formulated with the material gave films of excellent gloss and passed recoatability tests after 16 to 18 hours dry.

Example IX

A mixture of 1 part of rosin, 1 part of styrene and 0.24 part of dehydrated castor oil was heated as in Example III. Heating at 300 to 437 degrees F. for ten hours, followed by a one-hour steam blow gave a clear, amber, brittle resin having an acid value of 70 and a melting point of 150 degrees F.

A varnish was prepared by the procedure followed in Example III, using 1476 parts of dehydrated castor oil, 52 parts of glycerine, 3.2 parts of litharge and 1124 parts of the rosin-styrene-dehydrated castor oil resin. After the resin had been added, the temperature was held at 550 degrees F. for four hours. The product had a "cure" of 29 seconds, an acid value of 8.3 and a viscosity of Z (Gardner-Holdt) for 60% solids in mineral spirits. The varnish solution in mineral spirits at 60% solids was cloudy, and with 0.5% lead and 0.05% cobalt, calculated as naphthenate, driers, dried in satisfactory time to an excellent film except that it remained cloudy. Enamels formulated with the material gave films of fair gloss and passed recoatability tests after 16 to 18 hours dry.

Example X

A mixture of 9 parts of rosin, 1 part of styrene and 0.5 part of dehydrated castor oil was heated at 305–460 degrees F. for 10 hours. The product was a clear, amber, brittle resin having a melting point of 150 degrees F. and an acid number of 130.

This resin was converted to a varnish by the following procedure: 977 parts of dehydrated castor oil and 47 parts of glycerine were heated to 350 degrees F.; 1 part of litharge was added; the temperautre was raised to 440 degrees F. for 45 minutes; 588 parts of the resin was added; the temperature was raised to 460 degrees F. for 30 minutes and then to 550 degrees F. for 7 hours, at which time the acid number was 14.8 and the "cure" 25 seconds. The varnish solution at 60% solids in mineral spirits was clear and had a viscosity of S–T (Gardner-Holdt). The varnish films and enamels made from this varnish had good characteristics.

Example XI

A mixture of 200 parts of rosin, 100 parts of styrene and 15 parts of domestic raw Chinawood oil was heated to reflux at 325 degrees F. and raised as fast as the reflux rate would permit to 450 degree F. in five hours. The resultant polymer had a melting point of 125 degrees F. which remained constant for one hour of additional heating. The mixture was steam distilled for one hour and given a light carbon dioxide blow for 15 minutes to remove traces of moisture. The final melting point of the polymer was 136 degrees F. and the acid value was 100.

A varnish was prepared by heating a mixture of 2325 parts of dehydrated castor oil ("Dehydrol") and 107 parts of glycerine to a temperature of 350 degrees F., 4.5 parts of litharge was added and the temperature was raised to 440 degrees F. where it was held for 45 minutes. At this point 1575 parts of the previously prepared polymer was added and the temperature was raised to 550 degrees F. for five hours to a "cure" of 29 to 30 seconds and an acid number of 5–10. Mineral spirits was added to a concentration of 60% solids. The viscosity of the varnish was R–T (Gardner-Holdt). The varnish gave a clear solution and clear films which had approximately the same rate of dry but slightly more toughness than those obtained from the products of Examples I–X.

Enamels formulated with this material have excellent gloss and good recoatability characteristics.

Example XII

The same procedure was followed as in Example XI except that 21 parts of dehydrated castor oil was added in addition to the 15 parts of domestic raw China-wood oil. The mixture began to reflux at 325 degrees F. and the temperature was raised as rapidly as possible to 440 degrees F. in six hours. The melting point of the polymer was 100 degrees F. at this point and in one additional hour the melting point was 125 degrees F. where it remained constant for an additional hour. The mixture was steam distilled for one hour and given a light carbon dioxide blow for 15 minutes. The final melting point was 134 degrees F. and the acid value was 92.2.

A varnish was prepared by the procedure followed in Example XI using 1527 parts of dehydrated castor oil, 62 parts of glycerine and 1.6 parts of litharge. The castor oil and glycerine were heated to 400 degrees F., the litharge added and the temperature raised to 440 degrees F. for 45 minutes. The polymer (1120 parts) was then added and the temperature raised to 460 degrees F. where it was held for one-half hour. The temperature was then raised to 550 degrees F. in one-half hour and held at 550 degrees F. for six hours for a "cure" of 33 seconds and an acid value of 11.4. The viscosity of the varnish at 60% solids in mineral spirits was Q–R (Gardner-Holdt). It was a clear solution and gave clear films which had approximately the same rate of dry but slightly more toughness than the films obtained from the product of Example XI.

Enamels formulated with this material had excellent gloss and good recoatability characteristics.

Example XIII

The procedure was similar to Example XII except that 15 parts of oiticica oil was used instead of the China-wood oil. The polymer had a melting point of 132 degrees F. and an acid value of 93.

The varnish was heated to a "cure" of 35 seconds, and an acid value of 10.9. It had a viscosity of R–Q (Gardner-Holdt) in mineral spirits at 60% solids. The varnish solution was clear and gave clear films which had approximately the same rate of dry but slightly more toughness than the films obtained from the product of Example XI.

Enamels formulated with this material had excellent gloss and good recoatability characteristics.

Example XIV

A mixture of 300 parts of rosin, 200 parts of styrene, 25 parts of raw domestic China-wood oil and 35 parts dehydrated castor oil was refluxed and raised to 340 degrees F. in three hours, cooked to 375 degrees F. in six hours. Then the mixture was raised to 395 degrees F. for eight hours. The melting point of the polymer was 120 degrees F. and the acid value 92.

A varnish was prepared from the foregoing polymer by adding 600 parts of polymer to a mixture of 965 parts of dehydrated castor oil, 28.3 parts of glycerine and 1 part of litharge. The castor oil and glycerine were heated to 350 degrees F., the litharge added and the temperature advanced to 450 degrees F. where it was held 45 minutes. At this point the resin was added and the temperature raised to 550 degrees F. for six hours. The product had an acid value of 10, a "cure" of 25 seconds, and a viscosity of Z (Gardner-Holdt) at 60% solids in mineral spirits. The solution was clear and gave clear films which had approximately the same rate of dry but slightly more toughness than the films obtained from the products of Examples XII and XIII.

Enamels formulated with this material had excellent gloss and good recoatability characteristics.

Example XV

The procedure was generally similar to Example XIV except that 25 parts of oiticica oil were employed instead of the 25 parts of China-wood oil. The temperature of the mixture was raised gradually from 340 degrees F. to 390 degrees F. over a period of seventeen hours. The melting point of the polymer was 130 degrees F. and the acid value 71.

A varnish was made from the foregoing resin by adding 600 parts of resin to a mixture of 930 parts of dehydrated castor oil, 28.3 parts of glycerine and 1 part of litharge. The same procedure was followed as in Example XIV except that the temperature was held at 550 degrees F. for five and one-half hours. The product had an acid value of 13, a "cure" of 25 seconds, and a viscosity of Z (Gardner-Holdt) at 60% solids in mineral spirits. The solution was clear and gave clear films which had approximately the same rate of dry but slightly more toughness than the films obtained from the products of Examples XII and XIII.

Enamels formulated with this material had excellent gloss and good recoatability characteristics.

Example XVI

A mixture of 100 parts of rosin, 100 parts of styrene and 10 parts of China-wood oil was heated gradually from 310 to 450 degrees F. over a period of seven and one-half hours, the melting point remaining constant at 158 degrees F. through the last hour of heating. After an hour's steam blow, the melting point was 168 degrees F. and the acid value 76.5.

A varnish was prepared by heating a mixture of 1550 parts of dehydrated castor oil and 49 parts of glycerine to a temperature of 360 degrees F. before 1.6 parts of litharge was added. At this point, the temperature was raised to 440 degrees F. for forty-five minutes, 1050 parts of the rosin-styrene-China-wood oil resin was added and the temperature raised to 550 degrees F. for three hours. The product had an acid value of 11.2, a "cure" of 30 seconds, and a viscosity of S—T (Gardner-Holdt) at 60% solids. This material was not compatible with mineral spirits alone, but a solution containing 60% solids, 35% mineral spirits and 5% aromatic solvent was only slightly cloudy. The varnish gave clear films which had approximately the same rate of dry, but slightly more toughness than those obtained from the products of Examples XIV and XV.

Enamels formulated with this material had fair gloss and good recoatability characteristics.

Example XVII

A mixture of 100 parts of rosin, 100 parts of styrene, 10 parts of China-wood oil and 14 parts of dehydrated castor oil was heated at 310–450 degrees F. for eight hours. After a one-hour steam blow and a fifteen-minute carbon dioxide blow, the resin product had a melting point of 149 degrees F. and an acid value of 71.

This resin was used to prepare a varnish by the following procedure: 1775 parts of dehydrated castor oil and 61 parts of glycerine were heated to 400 degrees F.; 1.84 parts of litharge was added; temperature increased to 440 degrees F. for forty-five minutes; 1428 parts of the resin was added; the temperature was raised to 460 degrees F. for thirty minutes and to 550 degrees F. for three hours and forty minutes. The product had an acid value of 9, a "cure" of 37 seconds, and a viscosity of U (Gardner-Holdt) at 60% solids with 35% mineral spirits and 5% aromatic solvent. This varnish solution was cloudy, but with 0.5% lead and 0.05% cobalt as naphthenate driers, dried in satisfactory time to an excellent, clear film. Enamels formulated with this material had fair gloss and good recoatability characteristics.

Example XVIII

The procedure of Example XVI was duplicated in every detail, using oiticica oil instead of China-wood oil. The product had an acid value of 10, a "cure" of 37 seconds, and a viscosity of V (Gardner-Holdt) at 60% solids with 35% mineral spirits and 5% aromatic solvent. This varnish solution was cloudy but with 0.5% lead and 0.05% cobalt as naphthenate driers, dried in satisfactory time to an excellent, practically clear film. Enamels formulated with this material had fair gloss and good recoatability characteristics.

In the foregoing examples the interpolymers were made in 5-liter glass flasks equipped with thermometer, agitator, reflux condenser and water trap. The water trap was necessary to remove a small amount of water present in the rosin.

The term "cure" as used herein refers to the number of seconds required to gel a thin film of the reaction product of the alcoholyzed oil and the resin-styrene-oil interpolymer, when spread on a hot plate set at a designated temperature. In the examples all "cures" were performed on a hot plate set at 390 degrees F.

The "bar melting point" is the melting point determined by spreading the powdered resinous material on a bar having graduated temperatures along its length and ascertaining the temperature, by a thermocouple device, at that section of the bar where the powder melts.

The styrene used in the foregoing examples was a commercial monomeric styrene containing a small amount of an inhibitor or stabilizer (N99 grade of styrene containing 99% styrene, the remainder being impurities and a stabilizing agent against polymerization which became ineffective at temperatures above 300 degrees F.). The rosin used was a gum rosin (WW grade according to the rosin color scale) and the dehydrated castor oil employed was a 45 poise dehydrated castor oil.

The "mineral spirits" used in the examples had a boiling range of 150–200 degrees C. and less than 10% of aromatic hydrocarbons. This type of solvent is well known in the art and since it is substantially non-aromatic in character, is a preferred type of solvent for varnish bases. The "aromatic solvent" mentioned in the examples was an aromatic hydrocarbon solvent having a boiling range of 135–185 degrees C. and containing above 90% of aromatic hydrocarbons, such as xylene and the like.

It will be observed from the examples that the weight ratios of rosin, styrene and oil have been varied with the following results, the ratios of rosin, styrene and oil being given in parts by weight:

TABLE 1

*Summary of preparations*

| Example | Rosin | Styrene | Oil | Resin M.P. | Resin A.V. | Varnish Cure |
|---|---|---|---|---|---|---|
| I | 3 | 1 | Dehydrol ...... 1.29 | -------- | 91 | 3' |
| II | 2 | 1 | Dehydrol ...... 1.39 | -------- | 75.5 | 95'' |
| III | 2 | 1 | Dehydrol ...... 1.00 | -------- | 76.6 | 25'' |
| IV | 2 | 1 | Dehydrol ...... 0.45 | 128 | 89.4 | 30'' |
| V | 2 | 1 | Dehydrol ...... 0.36 | 130 | 93.5 | 32'' |
| VI | 1.5 | 1 | Dehydrol ...... 0.30 | 170 | 74.3 | 29'' |
| VII | 2 | 1 | Dehydrol ...... 0.15 | 145 | 101.8 | 23'' |
| VIII | 1.5 | 1 | Dehydrol ...... 0.13 | 160 | 93 | 30'' |
| IX | 1 | 1 | Dehydrol ...... 0.24 | 150 | 70 | 29'' |
| X | 9 | 1 | Dehydrol ...... 0.50 | 150 | 130 | 25'' |
| XI | 2 | 1 | China-wood ...... 0.15 | 136 | 100 | 28'' |
| XII | 2 | 1 | China-wood ...... 0.15 / Dehydrol ...... 0.21 | 134 | 92.2 | 33'' |
| XIII | 2 | 1 | Oiticica ...... 0.15 / Dehydrol ...... 0.21 | 132 | 93 | 35'' |
| XIV | 1.5 | 1 | China-wood ...... 0.125 / Dehydrol ...... 0.175 | 120 | 78.4 | 23'' |
| XV | 1.5 | 1 | Oiticica ...... 0.125 / Dehydrol ...... 0.175 | 130 | 72.1 | 25'' |
| XVI | 1 | 1 | China-wood ...... 0.1 | 168 | 76.5 | 30'' |
| XVII | 1 | 1 | China-wood ...... 0.1 / Dehydrol ...... 0.14 | 149 | 71 | 37'' |
| XVIII | 1 | 1 | Oiticica ...... 0.1 / Dehydrol ...... 0.14 | 149 | 71 | 37'' |

M. P. represents melting point.
A. V. represents acid value.

Table 2
Description of properties

| Example | Varnish, A. V. | Visc. | Comp. | Varnish film Clearness | Varnish film Type | Enamel film Gloss | Enamel film Recoatability |
|---|---|---|---|---|---|---|---|
| I | 12.5 | H | Good | Clear | Exc | Exc | 24 hr. Marginal. |
| II | 5.9 | K-L | do | do | do | do | Do. |
| III | 5.9 | U | do | do | do | do | Good 16–18 hrs. |
| IV | 4.7 | U | do | do | do | do | Do. |
| V | 9.27 | T | Border line | Faintly cloudy | do | do | Do. |
| VI | 6.35 | V | do | Cloudy | do | do | Do. |
| VII | 7.46 | W | Cloudy | do | do | do | Do. |
| VIII | 8.3 | X | do | do | do | do | Do. |
| IX | 8.3 | Z | do | do | do | Fair | Do. |
| X | 14.8 | S-T | Clear | Clear | do | Exc | Good. |
| XI | 8.3 | T | do | do | do | do | Do. |
| XII | 11.4 | Q-R | do | do | do | do | Do. |
| XIII | 10.9 | Q-R | do | do | do | do | Do. |
| XIV | 10 | Z | do | do | do | do | Do. |
| XV | 13 | Z | do | do | do | do | Do. |
| XVI | 11.2 | S-T | Cloudy | do | do | Fair | Do. |
| XVII | 9 | U | do | do | do | do | Do. |
| XVIII | 10 | V | do | do | do | do | Do. |

A. V. represents acid value.

The resin acid employed should preferably be a gum rosin, such as WW gum rosin, which has no crystallizing tendency. Wood rosin can be employed, although it is somewhat yellower and other oil soluble acidic resins containing free carboxylic acid groups can be used, but the best results have been obtained with rosin or materials containing rosin. As examples of other types of resin acids can be mentioned polymerized rosin, tallol, (a by-product of the paper industry containing about 41–50% rosin, 50% non-conjugated fatty acids and up to 9% unsaponifiables) and natural resins, such as cracked copals which are cracked to an acid number of say 30 to 50 and are oil soluble. Rosin usually has an acid number of 150 or higher and, in general, the resins used may have an acid number of 50 or higher.

Although pure styrene may be used, the commercial styrenes containing substances to stabilize them against polymerization at ordinary temperatures have been found to be satisfactory. Thus, styrene containing a stabilizer which became ineffective around 300 degrees F. gave good results. The styrene may also be replaced in part with alpha methyl styrene, para chloro styrene, alpha chloro styrene, meta chloro styrene, para methyl styrene, meta methyl styrene, ortho methyl styrene and/or dichloro or dimethyl styrene derivatives. In general, these compounds are characterized by a carbocyclic nucleus to which is attached an acyclic unsaturated hydrocarbon chain, more specifically, a vinyl group. Compounds of this type are referred to herein as styryl compounds. Dipentene and/or pinene may also be used to replace a portion of the styryl compound.

Various types of oils may be employed in the practice of the invention in the initial polymerization and subsequent varnish preparation, including both drying oils and semi-drying oils. Both types are referred to herein as drying oils. As examples of oils which are suitable for the practice of the invention, the following may be mentioned:

| | |
|---|---|
| Soybean oil, non-conjugated | Semi-drying oil |
| Linseed oil, non-conjugated | Drying oil |
| "Thermoil A," non-conjugated | Drying oil |
| "Dehydrol," about 20–25% conjugated | Drying oil |
| China-wood oil, about 80% conjugated | Drying oil |
| Oiticia oil, about 80% conjugated | Drying oil |

"Dehydrol" is a dehydrated castor oil. It has given excellent results and good results have also been obtained with linseed oil and a combination of "Dehydrol" and "Thermoil A." "Thermoil A" is an extracted and refrigerated fish oil resembling linseed oil in properties. The oils which have a high percentage of conjugation undergo very rapid polymerization during the heating period required for esterification and hence these oils, such as China-wood oil, have a tendency to gel at relatively high temperatures, say 550 degrees F. It is preferable, therefore, to employ these oils in smaller proportions than the less highly conjugated oils, such as dehydrated castor oil. In the polymerization step, if the drying oil employed is predominantly conjugated (such as, China-wood or oiticica) a relatively small amount is effective in improving the compatibility of polymers containing higher styrene contents.

If a predominantly non-conjugated drying oil is used (such as, dehydrated castor oil) the marginal limit to which satisfactory recoatability is obtained is around 35% drying oil by weight of the polymer, at ratios of rosin to styrene of 2:1, as illustrated by Example II. It is preferable, therefore, to employ a mixture of a highly conjugated drying oil and a less highly conjugated drying oil, as illustrated in Examples XII to XV.

If a predominantly conjugated drying oil is used (such as, China-wood oil or oiticica oil) the maximum amount of oil which can be used is determined largely by the amount which will cause gelling. For example, with a ratio of rosin to styrene to China-wood oil of 1:1:0.1 (see Example XVI) a satisfactory varnish was obtained, whereas with a ratio of rosin to styrene to China-wood oil of 1:1:0.2, the preparation gelled. Hence, the maximum amount of China-wood or other highly conjugated oil, based on the total weight of interpolymer, is approximately 5%. If a mixture of a predominately conjugated and a predominantly non-conjugated oil is employed, the proportion of the predominantly conjugated oil should be less than about 5% of the total weight of rosin and styrene and the maximum amount of total oil should be less than about 35% by weight of the total rosin and styrene (or their equivalents).

For the preparation of clear varnishes, the ratio of rosin to styrene (or their equivalents) should be at least 1:1 by weight and preferably 2:1 by weight. The upper limit is preferably a weight ratio of rosin to styrene (or their equivalents) of 9:1. For the production of enamels the same range of weight ratios of rosin to styrene are suitable. In the preparation of enamels it is possible to use varnish solutions which are slightly cloudy for preparing semi-gloss enamels unless a point is reached where the suspended particles interfere too greatly with the gloss.

The co-polymerization of the oil with the rosin and styrene (or their equivalents) contributes three marked improvements, namely, (1) the use of lower ratios of rosin to styrene without gelling, (2) an increase in compatibility between the resultant varnish base (made by esterifying an alcoholyzed oil with the interpolymer) and substantially non-aromatic solvents, and (3) a decided improvement in the rate of drying. The minimum amount of oil to be added, therefore, will be the amount which makes it possible to prepare non-gelling varnish bases at ratios of rosin to styrene from 1:1 to 2:1 and which gives a marked improvement in compatibility and/or rate of drying, with higher ratios of rosin to styrene as compared with varnish bases of the same ratio of rosin to styrene in which the interpolymer is formed from rosin and styrene alone. The term "compatibility" is used herein in its usual sense to describe the solubility of the varnish base in the solvent. If the varnish base dissolves in the solvent but is slightly cloudy, this is an indication of marginal compatibility. In case the varnish is compatible, but a film thereof is not recoatable after 24 hours, it is considered to be unsatisfactory from the standpoint of drying characteristics for the purpose of this invention.

In carrying out the invention the "cure" should be followed closely to prevent gelation during the reaction of the interpolymer with the alcoholyzed oil, and, when the proper "cure" is reached, the heating is stopped regardless of the acid number. The acid number at this point will ordinarily be below 25. A low acid number in the finished product is desirable because a high acid number tends to produce poor water resistance.

The "cure" test is not applied to the preparation of the interpolymer per se but rather to the preparation of the varnishes made by reacting the interpolymer with the alcoholyzed oil. The interpolymers of the invention are all thermoplastic, that is to say, when heated they will soften. When the interpolymer is reacted with the alcoholyzed oil, if the interpolymer did not originally contain the proper ratio of rosin to styrene to oil, the resultant product will gel to a solid form which is not thermoplastic, but thermosetting, and which is unsuited for the manufacture of varnishes and enamels. The final product, however, must be capable of setting to a film which does not soften with heat under ordinary atmospheric conditions. The "cure" test provides a standard for determining whether the interpolymer and the varnish base made therefrom are satisfactory.

Too long a "cure" indicates that the product will not dry properly, too short a "cure" indicates that it is too close to the point where it sets to a gel. A product with zero seconds "cure" is unsatisfactory. The reaction product of the interpolymer with the alcoholyzed oil preferably should have a "cure" between 20 and 60 seconds.

The nature of the reactions involved is not definitely known but it is believed that the styryl compound, the resin acid and the drying oil combine in the initial polymerization to produce a polymer containing free carboxylic acid groups.

In the alcoholysis reaction the polyhydric alcohol reacts with the oil glyceride, for example, according to the following equation in which glycerine is used as a typical polyhydric alcohol:

*Equation I*

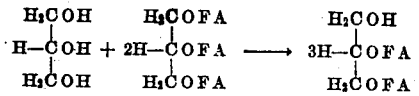

wherein FA is the residue of a fatty acid. Equation I is only a representative reaction of alcoholyzing an oil. The actual product is very likely a mixture of mono-, di-, and tri-glycerides giving an average number of free hydroxy groups dependent on the proportion of alcohol used. The previously prepared interpolymer then reacts with the alcoholyzed drying oil product of the above equation, the carboxylic acid radicals of the interpolymer esterifying the free hydroxy groups of the alcoholyzed oil product. At the same time some further interpolymerization probably occurs. It will be understood that the alcoholysis reaction may be carried further than illustrated in the foregoing equation by employing larger proportions of the alcohol and likewise that other types of polyhydric alcohols, as, for example, those previously mentioned, may be employed.

The amount of alcohol required to provide the necessary free hydroxy groups in the oil molecule for esterification of the carboxy groups of the interpolymer can be calculated by determining the acid number of the resin interpolymer and then calculating the theoretical quantity of the polyhydric alcohol required to provide the necessary free hydroxy groups. Generally, it is desirable to use a slight excess of the theoretical quantity of polyhydric alcohol, say about 10% by weight. The acid number is determined in a conventional manner by ascertaining the number of grams of potassium hydroxide required to neutralize 1000 grams of the interpolymer. For example, the molecular weight of glycerine is 92 and the equivalent weight for each hydroxyl group is, therefore, approximately 31 because it contains 3 hydroxy groups. The equivalent weight of potassium hydroxide is 56. Hence the following equation would give the theoretical amount of glycerine required:

*Equation II*

$^{31}/_{56} \times$ acid number of interpolymer → theoretical amount of glycerine per thousand parts of interpolymer Ordinarily, the esterification reaction does not completely esterify the free acid groups present in the interpolymer and the final acid number of the product is preferably within the range of 5 to 15.

Varnishes and enamels produced in accordance with the invention have a high solids content which is largely governed by the amount of solvent added and is preferably within the range of 50–60%.

In the preparation of the enamels any well known type of pigment may be employed, including titanium dioxide, chrome yellow, chrome green, red iron oxide, ferrite yellow, toluidine red, Prussian blue, lampblack and Monastral blue.

The preferred types of composition prepared in accordance with the invention form clear films having good gloss, low odor, good color, will dry overnight so that they are tack-free to foil, have excellent recoating characteristics and can be cut or thinned with substantially non-aromatic hydrocarbon solvents.

The rosin-styrene-drying oil interpolymers provided in accordance with this invention are believed to be new compositions of matter and are characterized generally by an acid value within the range from about 45 to 135, a ratio of rosin to styrene within the range of 1:1 to 9:1, and about 1% to 35% by weight of drying oil, preferably about 5% to 25% by weight. The preferred interpolymers are those which, when esterified to an acid number below about 15 by an alcoholyzed drying oil, or to a "cure" within the range of 20 seconds to 60 seconds, are soluble in substantially non-aromatic hydrocarbon solvents. These interpolymers preferably contain at least 2 parts by weight of the resin acid per part of styryl compound and are soluble in substantially non-aromatic solvents when at least partially esterified with 20 gallons of polyhydric alcoholyzed drying oil per 100 pounds of interpolymer (the drying oil being reacted with a sufficient amount of polyhydric alcohol to produce an average of one hydroxy group per molecule of oil glyceride).

It will be understood that the "length" of the varnish or enamel may vary within rather wide limits, preferably being within the range of about 12 to about 40 gallons of drying oil per 100 pounds of interpolymer.

The addition of the polyhydric alcohol serves the dual function of producing a product which chemically interacts by esterification with the interpolymer and at the same time reducing the acidity of the latter. This chemical action, furthermore, does not interfere with the polymerization that occurs on air drying and which is essential to the production of a hard, non-tacky film which can be recoated after drying.

The polymerization of styrene with oils is well known but compositions produced in this manner normally have poor gloss, poor recoating characteristics due to the fact that the first film has not been sufficiently converted to an insoluble stage to resist softening by the solvent of the second coat, and have a tendency to gel in the can due to the instability. Furthermore, they require a high percentage of aromatic solvents, which are objectionable and obnoxious.

Rosin alone added to oil produces coating compositions generally regarded as inferior in quality. Although ester gum can be added to the highly conjugated oils, such as China-wood oil, with good results, the addition of ester gum to the less highly conjugated types of oils produces compositions having poor water resistance, poor alkali resistance and poor drying characteristics. Heretofore in attempting to combine styrene with rosin for the manufacture of varnishes relatively large percentages of styrene have been used with the result that the products possessed poor oil solubility, lacked clarity and, in general, possessed the disadvantages of styrene alone. Since neither rosin nor styrene alone in the proportions previously used have given good results in varnish preparation, it could not be foreseen that the interpolymerization of these substances with a drying oil in certain proportions, coupled with the use of a polyhydric alcoholyzed drying oil, would produce novel and unexpected results.

Having thus described the invention, what we claim as new and desire to secure by Letters Patent of the United States is:

1. The product of the reaction of an interpolymer of styrene, rosin and dehydrated castor oil interpolymerized at a temperature within the range of 300° F. to 550° F., the weight ratio of rosin to styrene being within the range of 1:1 to 9:1 and the proportion of dehydrated castor oil being 5% to 35%, at least partially esterified with a product containing at least one free hydroxyl group resulting from the alcoholysis of dehydrated castor oil with a polyhydric alcohol.

2. An interpolymer of styrene, rosin and 5% to 35% of a drying oil interpolymerized at a temperature within the range of 300° F. to 550° F., the weight ratio of rosin to styrene being approximately 2:1, at least partially esterified with a product containing at least one free hydroxyl group resulting from the alcoholysis of a drying oil with a polyhydric alcohol.

3. A coating composition comprising a styrene interpolymerized with rosin and 5% to 35% by weight of a drying oil interpolymerized at a temperature within the range of 300° F. to 550° F. and at least partially neutralized with a product containing at least one free hydroxyl group resulting from the alcoholysis of a drying oil with a polyhydric alcohol, the quantity of rosin being at least as much as the quantity of styrene but not greater than a weight ratio of rosin to styrene of 9:1, the proportions of the rosin, styrene and the drying oil being effective to produce a resultant product having a "cure" within the range of 20 to 60 seconds when tested in the manner herein described.

4. A coating composition comprising an interpolymer of rosin, styrene and a drying oil in proportions approximating 2 parts by weight of rosin to 1 part by weight of styrene and 5% to 35% by weight of the drying oil interpolymerized at a temperature within the range of 300° F. to 550° F., said interpolymer being at least partially esterified with a product containing at least one free hydroxyl group resulting from the alcoholysis of a drying oil with a polyhydric alcohol, and a substantially non-aromatic hydrocarbon solvent.

5. A clear varnish composition capable of being applied to form clear films which exhibit good gloss, low odor, good color, satisfactory drying characteristics, good recoating characteristics, substantial resistance to water and alkalis, said composition being the product of polymerization of rosin, styrene and a drying oil in a weight ratio of rosin to styrene within the range from 1:1 to 9:1 and 5% to 35% drying oil, at least partially esterified with a polyhydric alcoholyzed drying oil obtained by heating glycerine with a drying oil which is predominantly non-conjugated under conditions effective to replace a portion of the fatty acid molecules in the oil glyceride nucleus with a hydroxy group, dissolved in a substantially non-aromatic solvent in proportions such that the solids content forms a major proportion by weight of said composition.

6. A composition as claimed in claim 5 in which the drying oil is dehydrated castor oil.

7. An enamel comprising the interpolymerization product of styrene, rosin and a drying oil interpolymerized in proportions of rosin to styrene within the range of from 1:1 to 9:1 and 5% to 35% drying oil, at least partially esterified and polymerized with a product containing at least one free hydroxyl group resulting from the alcoholysis of a drying oil with a polyhydric alcohol, dissolved in a substantially non-aromatic hydrocarbon solvent.

8. An interpolymer of a styrene, rosin and a drying oil in a weight ratio of rosin to styrene within the range from 1:1 to 9:1 and 5% to 35% of drying oil, calculated on the weight of the interpolymer, said interpolymer being formed at a temperature within the range of 300° F. to 550° F.

9. The product of the polymerization of a styrene, a rosin and a drying oil, which has an acid number within the range of 75 to 140, a ratio of the rosin to the styrene within the range from 1:1 to 9:1 interpolymerized at a temperature within the range of 300° F. to 550° F. and which when esterified to an acid number below 25 with a product containing at least one free hydroxyl group resulting from the alcoholysis of dehydrated castor oil with a polyhydric alcohol is soluble in mineral spirits containing less than 10% aromatic solvents.

10. A process of producing new and improved coating compositions which comprises interpolymerizing a rosin, styrene and 5% to 35% of a drying oil at a temperature within the range of 300° F. to 550° F., the weight ratio of the rosin to the styrene being within the range from 1:1 to 9:1, and at least partially esterifying the resultant polymerization product with a product containing at least one free hydroxyl group resulting from the alcoholysis of a drying oil with a polyhydric alcohol.

11. A method as claimed in claim 10 in which rosin and styrene are employed in a weight ratio of approximately 2:1.

12. A method as claimed in claim 10 in which the polyhydric alcoholyzed drying oil is obtained by heating glycerine with a dehydrated castor oil in proportion sufficient to replace at least one fatty acid group in the oil glycerine molecule with a hydroxyl group.

13. An interpolymer of styrene, an oil-soluble natural resin containing a free carboxylic acid group and having an acid value of at least 30 and 5% to 35% by weight of said interpolymer of a drying oil, interpolymerized at temperatures within the range of 300° F. to 550° F., the weight ratio of the resin to styrene being within the range of 1:1 to 9:1.

14. An interpolymer of styrene, an oil-soluble natural resin containing free carboxylic groups and having an acid value of at least 30, and a drying oil, interpolymerized at temperatures within the range of 300° F. to 550° F. in weight ratios of said resin to styrene within the range from 1:1 to 9:1 and from 5% to 35% by weight of the total interpolymer of a drying oil, at least partially esterified with a product containing at least one free hydroxyl group resulting from the alcoholysis of a drying oil with a polyhydric alcohol.

15. A coating composition comprising essentially an interpolymer of styrene, an oil-soluble natural resin acid containing free carboxylic acid groups and having an acid value of at least 30, and a drying oil, interpolymerized at temperatures within the range of 300° F. to 550° F. in a weight ratio of said resin acid to styrene within the range of 1:1 to 9:1 and from 5% to 35% by weight of said interpolymer of said drying oil, at least partially esterified with a product containing at least one free hydroxyl group resulting from the alcoholysis of a drying oil with a polyhydric alcohol, and a predominantly non-aromatic hydrocarbon solvent, said composition being capable of forming clear films which have good drying properties, good gloss, good color, good hardness, satisfactory recoatability and substantial resistance to water and alkalis.

16. A product of the interpolymerization of styrene, an oil-soluble natural resin containing free carboxylic acid groups and having an acid value of at least 50, and a drying oil interpolymerized at temperatures within the range of 300° F. to 550° F. in a weight ratio of said resin to styrene within the range from 2:1 to 9:1 and 5% to 35% of drying oil by weight of said interpolymer, said interpolymer being soluble in substantially non-aromatic hydrocarbon solvents when reacted with a product containing at least one free hydroxyl group resulting from the alcoholysis of a drying oil with a polyhydric alcohol.

17. A method of producing new and improved compositions which comprises interpolymerizing an oil-soluble natural resin containing free carboxylic acid groups and having an acid value of at least 30 with styrene and 5% to 35% by weight of a drying oil, based upon the total weight of said resin, styrene and drying oil, at temperatures within the range of 300° F. to 550° F., in proportions of said resin to styrene within the range from 1:1 to 9:1, and at least partially esterifying the resultant product with a product containing at least one free hydroxyl group resulting from the alcoholysis of a drying oil with a polyhydric alcohol.

18. A method of producing new and improved compositions which comprises interpolymerizing an oil soluble natural resin containing free carboxylic acid groups and having an acid value of at least 30 with styrene and 5% to 35% by weight of a drying oil, based upon the total weight of said resin, styrene and drying oil, at temperatures within the range of 300° F. to 550° F. in proportions of said resin to styrene within the range from 1 to 1 to 9 to 1.

JAMES A. ARVIN.
WAYNE B. GITCHEL.

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 1,993,028 | Peterson | Mar. 5, 1935 |
| 2,079,926 | Rosenblum | May 11, 1937 |
| 2,225,534 | Flint et al. | Dec. 17, 1940 |
| 2,320,724 | Gerhart | June 1, 1943 |
| 2,392,710 | Wakeford et al. | Jan. 8, 1946 |

Certificate of Correction

Patent No. 2,457,768.

December 28, 1948.

JAMES A. ARVIN ET AL.

It is hereby certified that errors appear in the printed specification of the above numbered patent requiring correction as follows:

Column 5, line 59, for "coudy" read *cloudy*; column 6, line 51, for "temperautre" read *temperature*; column 11, line 74, for "Oiticia" read *Oiticica*; and that the said Letters Patent should be read with these corrections therein that the same may conform to the record of the case in the Patent Office.

Signed and sealed this 17th day of May, A. D. 1949.

[SEAL]

THOMAS F. MURPHY,
*Assistant Commissioner of Patents.*